United States Patent [19]

Kondo et al.

[11] Patent Number: 5,258,848
[45] Date of Patent: Nov. 2, 1993

[54] EXPOSURE CONTROLLER OF A VIDEO CAMERA

[75] Inventors: Toshiharu Kondo; Takashi Kohashi; Shuji Shimizu, all of Kanagawa, Japan

[73] Assignee: Sony Corporation, Tokyo, Japan

[21] Appl. No.: 837,910

[22] Filed: Feb. 20, 1992

[30] Foreign Application Priority Data

Feb. 28, 1991 [JP] Japan .................... 3-057963

[51] Int. Cl.$^5$ ............................ H04N 5/238
[52] U.S. Cl. ..................... 358/228; 358/213.19; 354/410
[58] Field of Search .......... 358/213.19, 228; 354/410

[56] References Cited

U.S. PATENT DOCUMENTS 4,959,728  9/1990  Takahashi et al. .......... 358/228

OTHER PUBLICATIONS

Applicant's Submitted Prior Art (FIG. 1).

Primary Examiner—Joseph Mancuso
Assistant Examiner—Joseph Colaianni
Attorney, Agent, or Firm—Lewis H. Esligner; Jay H. Maioli

[57] ABSTRACT

An exposure control apparatus includes a control amount converting table for storing data on a gain control amount associated with data on a detected quantity of incident light. On the basis of an output from the control amount converting table, light quantity gains of light quantity variable means, such as an iris, a shutter, an AGC amplifier, and so forth, are set. The level of a quantity of incident light coming through these light quantity variable means is detected, and the detected data is fed to correcting means. The correcting means corrects an error between data on the control amount of the light quantity gain output from the control amount converting table and an actual light quantity gain of the light quantity variable means. An output from the correcting means is fed to the control amount converting table.

4 Claims, 3 Drawing Sheets

EXPOSURE CONTROLLER OF A VIDEO CAMERA

BACKGROUND OF THE INVENTION

1. This invention relates to an exposure controller of a video camera.

2. Description of the Prior Art

Exposure control in an existing video camera was performed by comparing an video signal level with a reference level and, in response to an output resulting from the comparison, by controlling the open amount of an iris and the gain of an AGC amplifier. The circuit arrangement for the existing exposure control was an analog circuit. The analog circuit, however, not only increased the scale of the circuit but also had a poor temperature characteristic. It was also difficult for the analog circuit to control various setting values as desired.

It has therefore been proposed to digitally arrange the exposure control circuit of a video camera. In one exposure control method formerly proposed by the present inventor, a table, which stores gain setting data associated with data on a quantity of incident light, is prepared. The quantity of incident light is obtained on the basis of the level of an video signal, the current open amount of the iris and the gain of the AGC amplifier. The quantity of incident light obtained is given to the table, and the open amount of the iris and the gain of the AGC amplifier are controlled in response to the gain setting data output from the table.

FIG. 1 shows an example of the existing exposure control circuit. In FIG. 1, optical information given through a lens 51 and an iris 52 is formed into an image on a surface of CCD image pickup device 53. The iris 52 is opened and closed by an iris driving circuit 54. The electronic shutter speed of the CCD image pickup device 53 is set by a shutter speed setting circuit 55.

An output from the CCD image pickup device 53 is supplied through an AGC amplifier 56 to an A/D converter 57. The A/D converter 57 converts the video signal from the CCD image pickup device 53 into a digital form. An output from the A/D converter 57 is supplied to a video signal processing circuit 58 and to a level detecting circuit 59. The level detecting circuit 59 detects the level of the video signal. An output from the level detecting circuit 59 is fed to a light quantity data generating circuit 60.

The light quantity data generating circuit 60 obtains data on the quantity of incident light on the basis of an output from the level detecting circuit 59. When denoting the quantity of incident light by $f_{IN}$, the iris gain by $K_{IRS}$, the shutter gain by $K_{SHU}$, and the AGC gain by $K_{AGC}$, the input video signal level $V_{IN}$ is expressed by:

$$V_{IN} = K_{IRS} \cdot K_{SHU} \cdot K_{AGC} \cdot f_{IN}$$

Then the quantity of incident light $f_{IN}$ is determined by:

$$f_{IN} = V_{IN} / K_{IRS} \cdot K_{SHU} \cdot K_{AGC}$$

The obtained data on the quantity of light is supplied from the light quantity data generating circuit 60 to a table 61. The table 61 stores gain setting values of respective elements (iris, shutter, AGC) associated with a quantity of incident light. In response to the data on the quantity of incident light from the light quantity data generating circuit 60, the table 61 outputs corresponding gain setting data of respective elements.

In response to iris gain setting data from the table 61, an iris driving signal is fed to an iris motor 54 via an iris driver 62 to control the opening amount of the iris 52. In response to shutter gain setting data from the table 61, the shutter speed setting circuit 55 controls the shutter speed. On the basis of AGC gain setting data from the table 61, the gain of the AGC amplifier 56 is controlled via a D/A converter 63.

In this manner, by performing exposure control in response to the data on the quantity of incident light obtained, the construction is simplified, and the exposure control condition can readily be changed by modifying data in the table 61. The existing exposure control circuit, however, involves such a problem that an error is produced in exposure control because of errors between the gain setting values of respective elements and actual gains of these elements.

OBJECT AND SUMMARY OF THE INVENTION

It is therefore an object of the invention to provide an exposure controller that can cure errors between gain setting values of respective elements and actual gains of these elements and ensures less erroneous control.

An exposure controller according to the invention includes a table for storing data on gain control amounts relative to data on a quantity of incident light, then obtains the ratio between an input video signal level and a reference level, corrects the data on the quantity of incident light on the basis of the ratio between the input video signal level and the reference level, then gives the corrected data on the quantity of incident light to a table, and controls exposure in response to the data on the gain control amounts output from the table.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
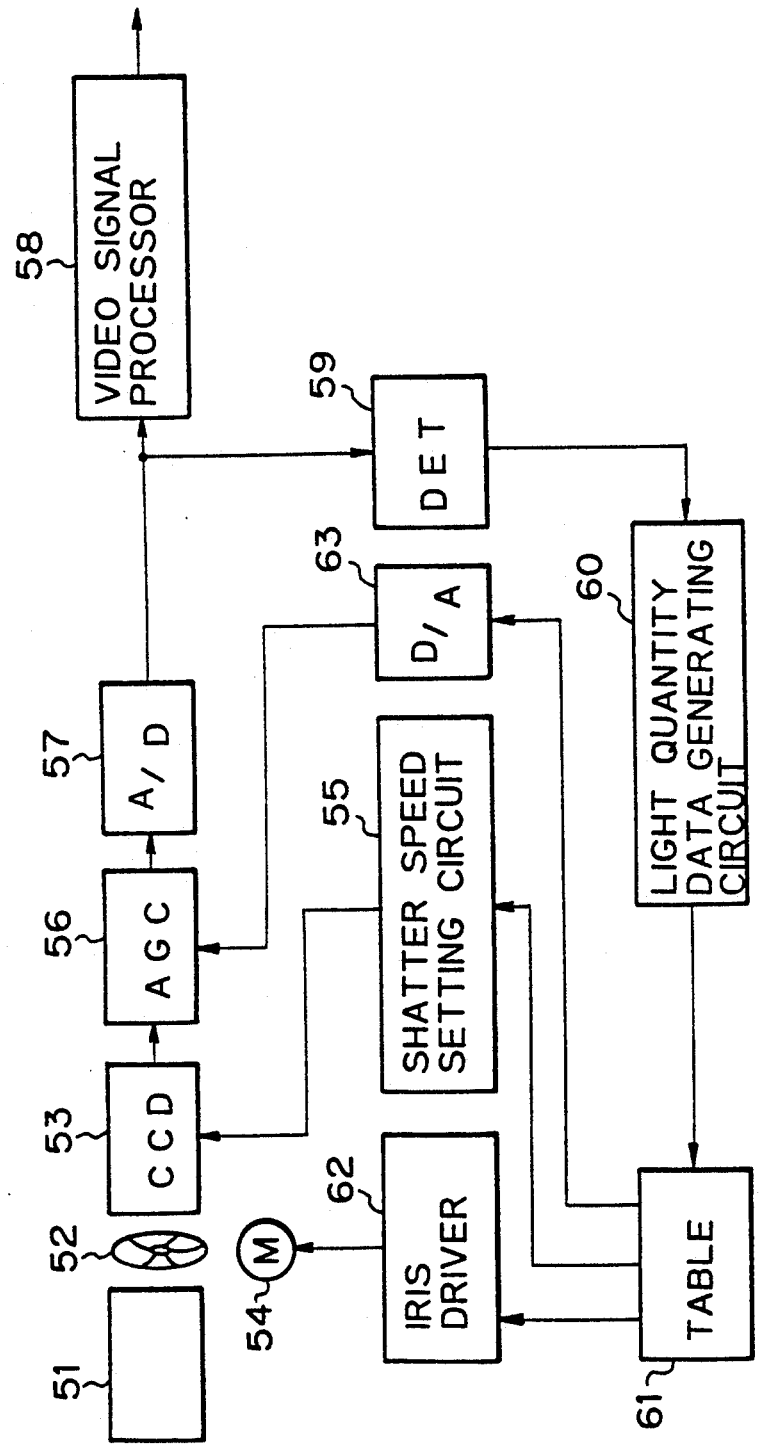
FIG. 1 is a block diagram of an existing exposure control circuit.
Figure 2:
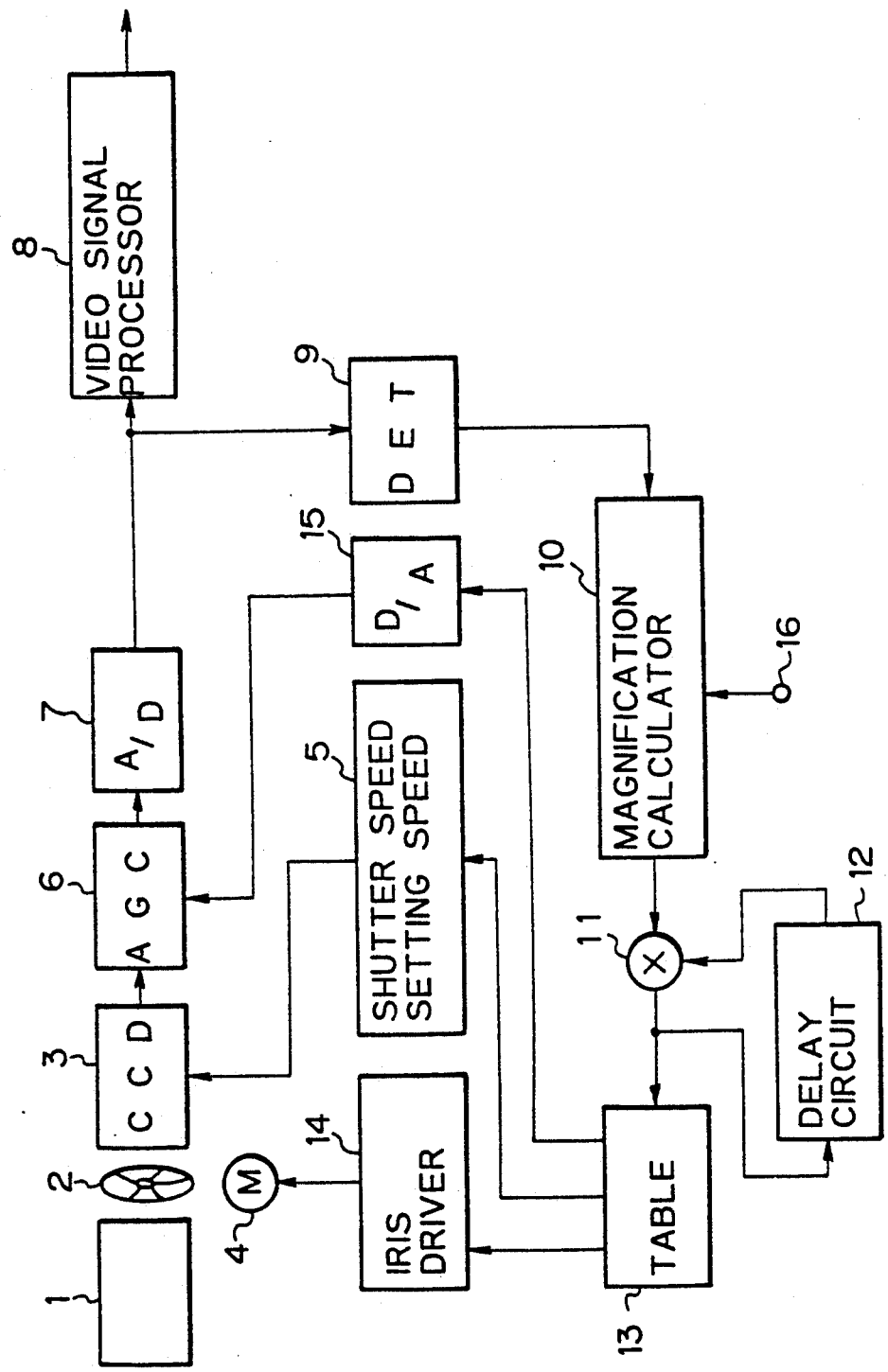
FIG. 2 is a block diagram of an embodiment of the invention.

An embodiment of the invention is explained below with reference to the drawings. FIG. 2 shows an embodiment of the invention. In FIG. 2, light information is fed through a lens 1 and an iris 2 to an optical detective surface of a CCD image pickup device 3. The iris 2 is controlled by an iris driving motor 4 to change the open amount thereof. The shutter speed of the CCD image pickup device 3 is set by a shutter speed setting circuit 5.

An output from the CCD image pickup device 3 is fed through an AGC amplifier 6 to an A/D converter 7. A video signal from the CCD image pickup device 3 is converted into a digital form by the A/D converter 7. An output from the A/D converter 7 is fed to a video signal processing circuit 8 and to a level detecting circuit 9. The level detecting circuit 9 detects the video signal level $V_{IN}$. The output $V_{IN}$ from the level detecting circuit 9 is fed to a magnification calculating circuit 10.

The magnification calculating circuit 10 is supplied with a reference level $V_r$ from a terminal 16. The magnification calculating circuit 10 calculates the ratio between the video signal level $V_{IN}$ and the reference level $V_r$. The ratio between the video signal level $V_{IN}$ and the reference level $V_r$ ($V_{IN}/V_r$) is fed to a multiplying circuit 11.

The multiplying circuit 11 is supplied with data F on the quantity of incident light through a delay circuit 12. The multiplying circuit 11 multiplies the output ($V_{IN}/V_r$) from the magnification calculating circuit 10 by the light quantity data F output from the delay circuit 12. As a result, the data F on the quantity of incident light is corrected on the basis of an error as explained later.

A table 13 stores gain setting values of respective elements in association with data on a quantity of incident light. That is, when denoting the iris gain by $K_{IRS}$, the shutter gain by $K_{SHU}$, the AGC gain by $K_{AGC}$, and the quantity of incident light by $f_{IN}$, the video signal level $V_{IN}$ detected by the level detecting circuit 9 is defined by:

$$V_{IN} = K_{IRS} \cdot K_{SHU} \cdot K_{AGC} \cdot f_{IN}$$

The table 13 stores values of respective gains $K_{IRS}$, $K_{SHU}$ and $K_{AGC}$ associated with the quantity of incident light $f_{IN}$. More specifically, when denoting the video signal level by $V_{INX}$ and a target reference level $V_r$, values in the table are set so as to satisfy:

$$K_{IRSX} \cdot K_{SHUX} \cdot K_{AGCX} \cdot f_{INX} = V_{INX} = V_r$$

that is, so as to satisfy:

$$V_r/f_{INX} = K_{IRSX} \cdot K_{SHUX} \cdot K_{AGCX}$$

with respect to the quantity of incident light $f_{IN}$ obtained.

Figure 3:
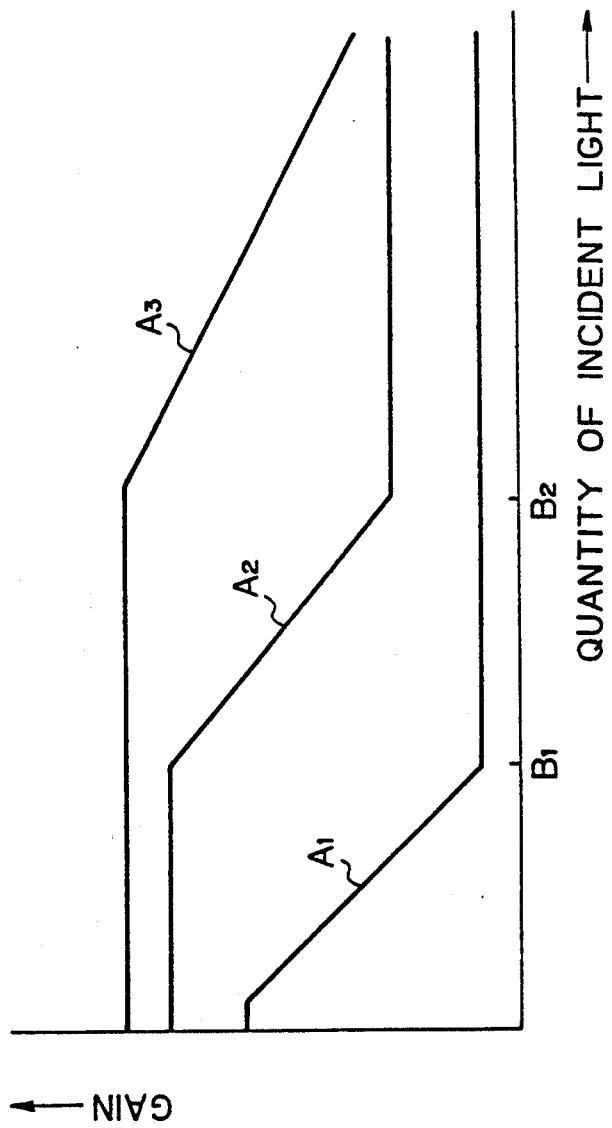
FIG. 3 is a graph used for explanation of an embodiment of the invention.

FIG. 3 is an example of the table 13. In FIG. 3, the abscissa indicates quantities of incident light, and the ordinate indicates gains. $A_1$ refers to the AGC gain, $A_2$ to the iris gain, and $A_3$ to the shutter gain. When the brightness is below $B_1$, exposure control is effected by changing the gain of the AGC amplifier 6. When the brightness is $B_1$ to $B_2$, exposure control is effected by controlling the opening amount of the iris 2. When the brightness is above $B_2$, exposure control is effected by changing the shutter speed.

In FIG. 2, gain setting values of respective elements are read out from the table 13 in response to an output from the multiplying circuit 11. Based on the iris gain setting value from the table 13, an iris driving signal is fed to the iris motor 4 via an iris driver 14. Based on the shutter gain setting value from the table 13, the shutter speed is controlled by the shutter speed setting circuit 5. Based on the AGC gain setting value from the table 13, the gain of the AGC amplifier 6 is controlled via a D/A converter 15.

Assume here that data $F_1$ on the quantity of incident light is given to the table 13 and that the table 13 outputs iris gain setting value $K_{IRS1}$, shutter gain setting value $K_{SHU1}$, and AGC gain setting value $K_{AGC1}$ in response to the data $F_1$ on the quantity of incident light. Then gains of respective elements are determined on the basis of the iris gain setting value $K_{IRS1}$, the shutter gain setting value $K_{SHU1}$, and the AGC gain setting value $K_{AGC1}$ from the table 13.

However, the gains that are actually set include errors relative to the iris gain setting value $K_{IRS1}$, the shutter gain setting value $K_{SHU1}$, and the AGC gain setting value $K_{AGC1}$ from the table 13. That is, when denoting the actual iris gain by $k_{IRS1}$, the actual shutter gain by $k_{SHU1}$, and the actual AGC gain by $k_{AGC1}$, respectively, they are represented by:

$$k_{IRS1} = K_{IRS1} \cdot \epsilon_{IRS}$$

$$k_{SHU1} = K_{SHU1} \cdot \epsilon_{SHU}$$

$$k_{AGC1} = K_{AGC1} \cdot \epsilon_{AGC}$$

where $\epsilon_{IRS}$, $\epsilon_{SHU}$, and $\epsilon_{AGC}$ are errors of the actual values relative to the respective setting values of the iris gain, the shutter gain, and the AGC gain.

Under the condition where gains of respective elements have been set as indicated above, when a quantity of incident light $f_{IN1}$ is input through the lens 1, a corresponding video signal level $V_{IN1}$ detected by the level detecting circuit 9 is:

$$\begin{aligned} V_{IN1} &= f_{IN1} \cdot k_{IRS1} \cdot k_{SHU1} \cdot k_{AGC1} \\ &= f_{IN1} \cdot K_{IRS1} \cdot K_{SHU1} \cdot K_{AGC1} \cdot \epsilon_{IRS} \cdot \epsilon_{SHU} \cdot \epsilon_{AGC} \end{aligned}$$

The magnification calculating circuit 10 obtains the ratio between a current output from the level detecting circuit 11 and the reference level $V_r$. That is, the magnification calculating circuit 10 obtains:

$$\begin{aligned} V_{IN1}/V_r &= f_{IN1} \cdot k_{IRS1} \cdot k_{SHU1} \cdot k_{AGC1}/V_r \\ &= f_{IN1} \cdot K_{IRS1} \cdot K_{SHU1} \cdot K_{AGC1} \cdot \epsilon_{IRS} \cdot \epsilon_{SHU} \cdot \epsilon_{AGC}/V_r \end{aligned}$$

As described before, the reference level $V_r$ satisfies:

$$V_r/f_{INX} = K_{IRSX} \cdot K_{SHUX} \cdot K_{AGCX}$$

Therefore, $$V_r = K_{IRS1} \cdot K_{SHU1} \cdot K_{AGC1} \cdot f_{IN1}$$

As a result, an output from the magnification calculating circuit 10 is:

$$\begin{aligned} V_{IN1}/V_r &= f_{IN1} \cdot K_{IRS1} \cdot K_{SHU1} \cdot K_{AGC1} \cdot \epsilon_{IRS} \cdot \epsilon_{SHU} \cdot \epsilon_{AGC}/V_r \\ &= \epsilon_{IRS} \cdot \epsilon_{SHU} \cdot \epsilon_{AGC} \end{aligned}$$

That is, an error $\epsilon_{IRS} \cdot \epsilon_{SHU} \cdot \epsilon_{AGC}$ between the gain setting value and the actual gain is obtained by the magnification calculating circuit 10.

The data $F_1$ on the quantity of incident light and the error $\epsilon_{IRS} \cdot \epsilon_{SHU} \cdot \epsilon_{AGC}$ are multiplied by the multiplying circuit 11. Then the data $F_1$ on the quantity of incident light is corrected in accordance with the error $\epsilon_{IRS} \cdot \epsilon_{SHU} \cdot \epsilon_{AGC}$. On the basis of the corrected data on the quantity of incident light ($F_1 \cdot \epsilon_{IRS} \cdot \epsilon_{SHU} \cdot \epsilon_{AGC}$), respective gain setting values are read out from the table 13.

When the video signal level $V_{INX}$ reaches the reference level $V_r$, the output from the magnification calculating circuit 10 represents zero, and the corresponding data on the quantity of incident light is held.

According to the invention, errors between gain setting values of respective elements and actual gains of respective elements can be corrected, and less erroneous control is ensured. Further, the invention can set gains of respective elements by using a single output of level detection.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An exposure control apparatus comprising:
    a gain control amount converting table for storing data on AGC, iris and shutter gain control amounts respectively associated with data on a detected quantity of incident light;
    light quantity variable means for varying the light quantity gain relative to a quantity of incident light on the basis of said data on a gain control amount, said light quantity variable means including means for varying the light quantity gain by opening and closing an iris, means for varying the light quantity gain by changing the shutter speed, and means for controlling the light quantity by changing the gain of an AGC amplifier;
    incident light quantity detecting means for detecting the level of an electrical signal which is a function of light incident upon said light quantity variable means and for outputting data on the level of said electrical signal;
    means for generating a predetermined reference level; and
    correcting means responsive to said data on the level of said electrical signal and said predetermined reference level for correcting errors between the data on the gain control amount set for said light quantity variable means and the actual light quantity gain of said light quantity variable means,
    wherein an output of said correcting means is given to said control amount converting table, and the light quantity gain of said light quantity variable means is set in accordance with an output from said control amount converting table; and
    wherein at low light levels the gain to said AGC amplifier is adjusted, at intermediate light levels said iris is adjusted, and at high light levels said shutter speed is adjusted.

2. An exposure control apparatus according to claim 1 wherein said control amount converting table obtains said quantity of incident light by:

$$F=V/K$$

where F is the quantity of light, K is the gain of said light quantity variable means, and V is the detected level of incident light coming through said light quantity variable means, and wherein data on the gain control amount corresponding to the data F on the quantity of incident light is output.

3. An exposure control apparatus according to claim 1 wherein said correcting means includes a magnification calculating circuit for obtaining the ratio between the data on the quantity of incident light output form said incident light quantity detecting means and said predetermined reference level, a multiplying circuit for multiplying an output of said magnification calculating circuit and a delayed output of itself, and a delay circuit for delaying an output of said multiplying circuit and for applying said delayed output to said multiplying circuit.

4. An exposure control apparatus according to claim 1 wherein said control amount converting table obtains the quantity of incident light by:

$$F=V/K_1 \cdot K_2 \cdot K_3$$

where F is the quantity of incident light, $K_1$ is the light quantity gain of the iris, $K_2$ is the light quantity gain of a shutter, $K_3$ is the light quantity of the AGC amplifier, and V is the detected level of the incident light coming through said light quantity variable means, and wherein data on the control amount of the light quantity gain of the iris, data on the control amount of the light quantity gain of the shutter, and data on the control amount of the light quantity gain of the AGC amplifier that are responsive to said data F on the quantity of incident light are output.

* * * * *

UNITED STATES PATENT AND TRADEMARK OFFICE
CERTIFICATE OF CORRECTION

PATENT NO. : 5,258,848
DATED : November 2, 1993
INVENTOR(S) : Toshiharu Kondo, Takashi Kohashi and Shuji Shimizu It is certified that error appears in the above-indentified patent and that said Letters Patent is hereby corrected as shown below:

Col. 5, line 30, after "quantity" insert --gain--

Signed and Sealed this

Fourth Day of July, 1995

Attest:

BRUCE LEHMAN

*Attesting Officer*     *Commissioner of Patents and Trademarks*